M. O. REEVES.
FRICTION DEMONSTRATOR.
APPLICATION FILED MAR. 1, 1915.
1,146,448.
Patented July 13, 1915.
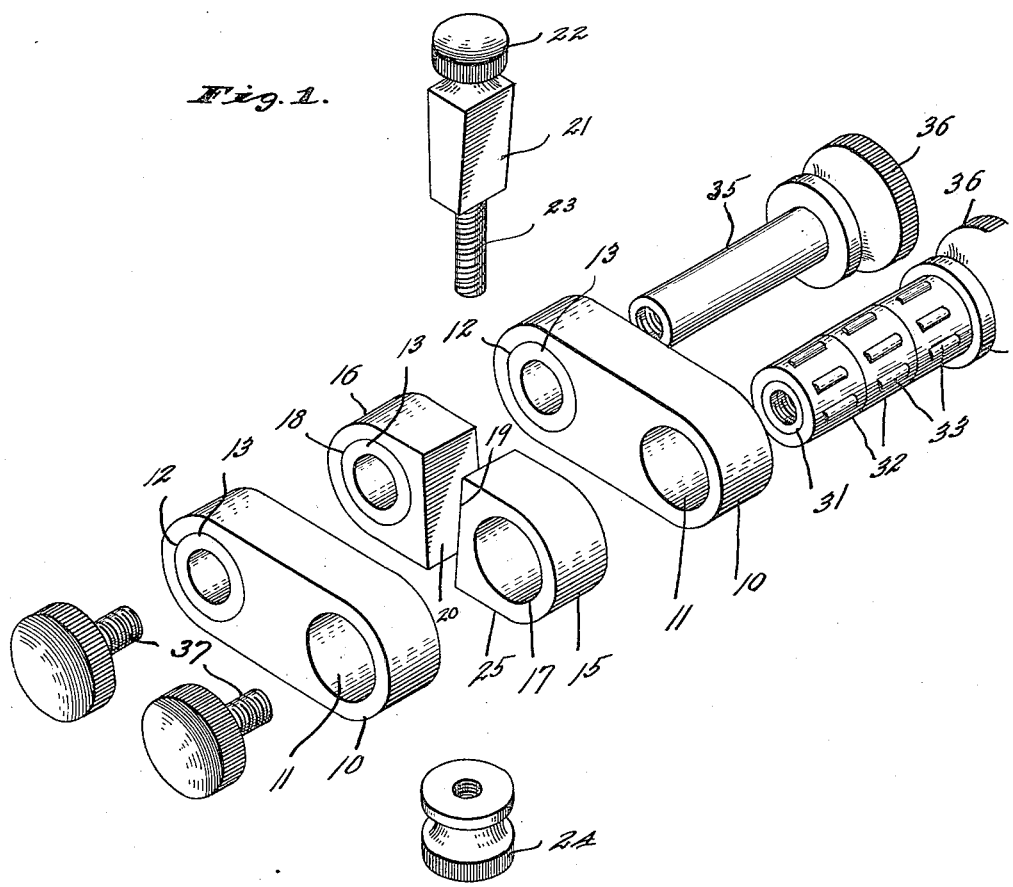
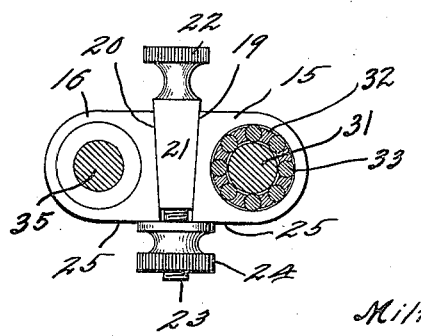
WITNESSES:
Frank A. Fahle
Josephine Gasper
INVENTOR
Milton O. Reeves,
BY
Hood & Schley
ATTORNEYS

UNITED STATES PATENT OFFICE.

MILTON O. REEVES, OF COLUMBUS, INDIANA, ASSIGNOR TO REEVES PULLEY CO., OF COLUMBUS, INDIANA, A CORPORATION OF INDIANA.

FRICTION-DEMONSTRATOR.

1,146,448.     Specification of Letters Patent.     Patented July 13, 1915.

Application filed March 1, 1915. Serial No. 11,245.

*To all whom it may concern:*

Be it known that I, MILTON O. REEVES, a citizen of the United States, residing at Columbus, in the county of Bartholomew and State of Indiana, have invented a new and useful Friction-Demonstrator, of which the following is a specification.

It is the object of my invention to provide a demonstrating device for use by salesmen and others to demonstrate the relative effects of friction on different kinds of bearings, and especially the relative effect of plain bearings and roller bearings.

The accompanying drawing illustrates my invention.

In this drawing Figure 1 is a perspective view of the various parts of my friction demonstrator, with the parts separated but in position to go together; and Fig. 2 is a cross section through the device, to show the action of the wedging parts.

There are two end cross bars 10, each of which at its opposite ends is provided with holes 11 and 12, and in the holes 12 are bushings 13. Between the two cross bars 10 are two binding members 15 and 16, arranged side by side and provided respectively with holes 17 and 18 which register with the holes 11 and 12 respectively when the parts are assembled. The hole 18 also contains a bushing 13. The binding members 15 and 16 are spaced from each other, their adjacent faces 19 and 20 being at a slight angle to each other. A wedge 21 fits into the space between the faces 19 and 20 and coöperates therewith, this wedge 21 conveniently having a handle 22 at its larger end and its smaller end being provided with a screw 23 for receiving a knurled nut 24 which bears against the surfaces 25 of the binding members 15 and 16 to draw the wedge 21 in between the faces 19 and 20 to any desired extent. A shaft 31 extends through the holes 11 and 17, and is provided with three bushings 32 which are located respectively within the two holes 11 and the hole 17 when the parts are assembled. Each of these bushings 32 is provided with a series of anti-friction devices, such as the rollers 33, which on the exterior of the bushings 32 bear against the surfaces of the holes 11 and 17 and on the interior of such bushings bear against the outer surface of the shaft 31. A shaft 35 extends through the bushings 13 in the holes 12 and 18, having an easy fit in such bushings. The shafts 31 and 35 may have knurled knobs 36 at one end for turning them, and at the other end are internally threaded to receive screws 37 for holding them in place.

In operation, when the nut 24 is loose the shafts 31 and 35 may both be turned easily by their coöperating knobs 36. However, by tightening up the nut 24, the wedge 21 is drawn inward between the surfaces 19 and 20 and the two binding members 15 and 16 are forced apart to bring the holes 17 and 18 slightly out of alinement with the holes 11 and 12 respectively. This causes a binding action on the two shafts 31 and 35, the force of which binding action is the same on the two shafts. However, as this binding action increases, and the friction resultant thereupon likewise increases, the resistance to the turning of the shaft 35 by its operating knob 36 soon reaches a point where it greatly hinders or even prevents absolutely the turning of such shaft, while at the same time, because of the roller or other anti-friction bearings 33, the shaft 31 may easily be turned by its operating knob 36, although it has the same binding force acting upon it as has the shaft 35. Thus a complete and easily seen comparison of ordinary bearings with the anti-friction bearing being used is furnished.

I claim as my invention:

1. A friction demonstrator, comprising two shafts, a frame in which said shafts are rotatably mounted, said two shafts being provided respectively with two types of bearings, and unitary means for producing equal binding effects on the two shafts in their bearings, whereby a ready comparison of the effect of the same binding force on the two types of bearings is obtained.

2. A friction demonstrator, comprising a frame, two shafts rotatably mounted in said frame, one of said shafts having a plain bearing and the other having a roller bearing in said frame, separate binding members in which said two shafts also have a rotatable mounting with the same types of bearings respectively as in the frame, and means for applying equal forces on said binding members tending to move them transversely of the respective shafts associated with them.

3. A friction demonstrator, comprising a frame, two shafts rotatably mounted in said frame, one of said shafts having a plain bearing and the other having a roller bearing in said frame, separate binding members in which said two shafts also have a rotatable mounting with the same type of bearings respectively as in the frame, and a wedge acting on both of said binding members and tending to equally move them transversely of their respective shafts.

4. A friction demonstrator, comprising two end cross pieces each of which has two holes through it, corresponding holes in the two end cross pieces being in alinement, two shafts each of which extends through corresponding holes in the two end cross pieces, a binding member mounted on each of said shafts between the two end cross pieces, one of said shafts having a roller bearing in the cross pieces and its associated binding member and the other having an ordinary bearing in said cross piece and its associated binding member, and a wedge mounted between said two binding members and acting to separate them when forced inward.

5. A friction demonstrator, comprising two end cross pieces each of which has two holes through it, corresponding holes in the two end cross pieces being in alinement, two shafts each of which extends through corresponding holes in the two end cross pieces, a binding member mounted on each of said shafts between the two end cross pieces, one of said shafts having one type of bearing in said two cross pieces and its associated binding member and the other having a different type of bearing in said cross pieces and its associated binding member.

In witness whereof, I MILTON O. REEVES have hereunto set my hand at Columbus, Indiana, this 25th day of February, A. D. one thousand nine hundred and fifteen.

MILTON O. REEVES.

Witnesses:
 JNO. JEWELL,
 C. TYRRELL.

Copies of this patent may be obtained for five cents each, by addressing the "Commissioner of Patents, Washington, D. C."